United States Patent [19]

Lawton

[11] 4,094,687

[45] June 13, 1978

[54] HEAT-SENSITIVE RECORDING COMPOSITION

[76] Inventor: William R. Lawton, 6651 Jewett-Holmwood Rd., Orchard Park, N.Y. 14127

[21] Appl. No.: 774,330

[22] Filed: Mar. 4, 1977

Related U.S. Application Data

[63] Continuation-in-part of Ser. No. 772,084, Feb. 25, 1977, and Ser. No. 774,210, Mar. 3, 1977, and Ser. No. 774,385, Mar. 4, 1977.

[51] Int. Cl.² .................. C09D 11/00; G03C 1/52
[52] U.S. Cl. .............................. 106/21; 8/2; 8/4; 8/7; 96/90 R; 252/1; 428/913; 106/26
[58] Field of Search ................... 8/2, 7, 4; 252/1; 260/268 DK, 268 PL; 346/135; 96/90 R; 428/913; 106/26

[56] References Cited

U.S. PATENT DOCUMENTS 3,969,316  7/1976  Ramey et al. ............. 260/268 DK

*Primary Examiner*—Leland A. Sebastian
*Attorney, Agent, or Firm*—Kegan, Kegan & Berkman

[57] ABSTRACT

A heat reactive recording composition capable of acquiring a stable color in selected regions contrasting with the background color of the sheet upon exposing these regions to an elevated temperature and comprising a paper or polymeric film substrate and a coating comprising (1) an N-substituted condensation product of a heterocyclic diimino compound and an aromatic aldehyde and (2) a cyclic polyketo compound reactive with amines and amides at elevated temperatures to form a color.

5 Claims, No Drawings

HEAT-SENSITIVE RECORDING COMPOSITION

This application is a continuation-in-part of my co-pending U.S. applications Ser. No. 772,084 filed Feb. 25, 1977 for HEAT SENSITIVE RECORDING COMPOSITION WITH COMPLEXED PHENOLICS; Ser. No. 774,210 filed Mar. 3, 1977 for HEAT-SENSITIVE COATING WITH 4-SUBSTITUTED PIPERIDINE DERIVATIVE AND CYCLIC POLYKETO COMPOUND; and Ser. No. 774,385 filed Mar. 4, 1977 for HEAT-SENSITIVE RECORDING COMPOSITION WITH MIXED COLOR PRECURSORS.

BACKGROUND OF THE INVENTION

This invention relates to recording members containing heat reactive components and, more particularly, to recording members capable of use in thermographic copying, thermal printing, event recording, and as transparencies for overhead projection.

Heat sensitive sheets containing the cyclic polyketo compounds of this invention, useful for copying and recording and characterized by the ability to form a mark of contrasting color when heated to an activation temperature of 50° C are known in the art. They are used in thermographic processes wherein a recording member is positioned on a graphic original and exposed to infrared radiation to cause selective heating of the dark areas of the original sufficient to form a copy thereof on the heat sensitive member. The thermally responsive members have also been used to record the heated portions of a thermal print-head and also to record a colored trace when contacted by the hot stylus of a thermal recorder. The ninhydrinamine reaction wherein ninhydrin reacts with amino acids, primary amines, and certain derivatives of morpholine, piperidine, and pyrrolidine to give the dye commonly referred to as Ruhrman's purple, is well known. Isatin reacts with these same amines to give isatin blue. Alloxan reacts with the amines to give a red dye. These reactions have been used in numerous inventions for thermally responsive copy and recording papers and films. Lawton, U.S. Pat. No. 3,736,166 used ninhydrin with various morpholine and piperidine derivatives to prepare transparencies for overhead projection. Lawton, U.S. Pat. No. 3,293,061 combined ninhydrin or hydridantin with isatin-amine condensates to provide thermographic copy sheets. Bauman and Lawton reacted ninhydrin or hydrindantin with complexes of amines and flavans or phenolic compounds to make thermographic copy sheets, see U.S. Pat. No. 3,149,991 and U.S. Pat. No. 3,149,992. Huffman, U.S. Pat. No. 3,664,858 combined ninhydrin with the adducts of morpholine or piperidine and organic acids in thermal recording members. Sus, U.S. Pat. No. 3,024,362 combined hydridantin with amino acids or salts of primary amines with organic carboxylic and sulfonic acids to make a thermocopy paper. Allen, U.S. Pat. No. 2,967,785 used the adducts of morpholine or piperidine with isatin or ninhydrin as the color forming material in thermocopy papers. Small, U.S. Pat. No. 3,573,958 combined an amine with a halide or organometallic halide of germanium, silicone, lead, and tin with hydrindantin to provide a heat sensitinve recording sheet. In each case the normal dye formation of Ruhrman's purple with ninhydrin, red dye with alloxan, and isatin blue were obtained.

It is often desirable and an objective of this invention to obtain colored records which have colors differing from those normally obtained with the above cyclic polyketo compounds.

Undesirable odors and fumes are obtained by the heat dissociation or decomposition of the complexes, salts, or adducts during the imaging process. There is a problem of image bleaching during excessive heating, or aging, or prolonged exposure to ultraviolet containing light.

Attempts to use heterocyclic diimino compounds such as the piperazine derivatives results in colorless or very pale images, general deterioration of coatings, and a coating layer unacceptable due to the very hygroscopic nature of the piperazines and their unpleasant odor.

SUMMARY OF INVENTION

I have found that the above objectionable problems can be minimized or eliminated by the combination of an N-substituted piperazine or other N-substituted heterocyclic diimino compound obtained by condensing the piperazine with an aromatic aldehyde, and a cyclic polyketo color precursor. The heterocyclic diiminoaldehyde condensate and the color precursor react at temperatures between 50° C and 200° C to form a number of different highly colored dyes. The volatility, odor, and hygroscopic characteristics of the original piperazine derivatives are eliminated. The materials for preparing the piperazine condensates are generally less expensive than those used for the adducts and complexes described in the prior art and the product yield is high which leads to a less costly record member.

DETAILED DESCRIPTION OF THE INVENTION

Preparation of the Substituted Heterocyclic Diimine Compound

One gram mole of the cyclic diimino compound such as piperazine or substituted piperazine or homopiperazine or its derivative is condensed with one gram mole of an aromatic aldehyde by refluxing in methanol or ethanol for 4 to 8 hours. Upon cooling, the condensate precipitates, the precipitate is filtered off, washed with alcohol and dried. If a precipitate does not readily form, precipitation may be induced by adding water to the reaction mixture.

Preparation of Transparencies

The cyclic polyketo compound and the piperazine condensate are dissolved in a binder contained in an organic solvent. The binder acts only as a vehicle to carry the color reacting products. Any transparent binder such as acrylic and methacrylic copolymers, cellulose esters, nitrocellulose, polyvinyl acetates, butyrals, styrene polymers and copolymers, etc., can be used. The solvents convenient for us with this system include ketones such as methylethylketone, alcohols such as methanol, esters such as ethyl acetate, and aromatics such as toluene. It is normal to include stabilizers in the transparency formulations. Commonly used stabilizers are those described in U.S. Pat. No. 3,736,166 and include substituted ureas and thioureas such as ethylurea, n-propyl urea, allylurea, N-methyl thiourea, and allyl thiourea; gallic acid; o- m- and p-toluic acids; 2- mercaptobenzothiazole; and 2,2'-dithiobis (benzothiazole).

Activators can be used to increase the sensitivity or thermal response of the transparencies as well as the recording papers of this invention. A simple procedure for selecting useful activators is as follows:

A grind of selected heterocyclic condensate and a cyclic polyketo compound is obtained by ball-milling these materials as a dispersion in an aqueous solution of polyvinyl alcohol. The dispersion is coated onto a base paper such as a 25 lb/3000 sq ft sulfite paper and air dried. The potential activator is applied to a spot of the coated paper and heated on a hot plate. If the color develops more rapidly in the area where the additive powder has been applied, the material will increase the sensitivity of the system when compounded with the heterocyclic condensate and cyclic polyketo compound of this invention. Some of the more suitable activators include the following:

TABLE I 2-mercaptobenzoxazole
2-mercaptobenzothiazole
2,2'-dithiobis(benzothiazole)
2-benzoxazolethiol
2-benzothiazolol
2-morpholinothiobenzothiazole
2,4-dichloro-1-naphthol
2-chloroacetamide
o-, m-, and p-toluic acids
thioacetanilide
thiobenzanilide
phenoxazine
phenyl-3-thiocarbazide
N-cyclohexyl-2-benzothiazolesulfenamide (Santocure Powder)
2-(2,6-dimethyl-4-morpholinothio benzothiazole) (Santocure 26)
N-tert-butyl-2-benthiazolesulfenamide (Santocure NS)
sulfanilamide
4,4'-dithiodimorpholine (Sulfasan R)
1, 1, 3, 3-tetramethyl-2-thiourea
2,4-thiazolidenedione
thiazolidenethione
N-methylbenzothiazole-2-thiourea
p-hydroxyacetophenone
1,3-indanedione
butyl ziram
2,2-dithiobis(benzothiazole)
chloroacetophenone
3,5-dibromosalicylaldehyde
3,4-dihydroxybenzoic acid
biphenyl
acetone oxime Suitable transparent films which may be used as the substrate for the transparencies include Mylar brand terephthalate polyester film manufactured by duPont, polycarbonates, polyamides, polystyrene and cellulose acetate-butyrate copolymers.

The coatings may be applied by any of the normal coating procedures such as Meyer rod, reverse roll, kiss-coat, etc. The coating weights of the thermosensitive layers can be varied from 2 to over 10 lb/3000 sq ft.

Example A, which follows, shows typical combinations useful as transparencies for overhead projection.

EXAMPLE A

Preparation of Transparencies for Overhead Projection

A resin solution of the following composition was prepared:

| | Parts |
|---|---|
| methanol | 134 |
| methylethylketone | 386 |
| Nitrocel RS 5 to 6 sec. (Hercules) (nitrocellulose) | 39 |
| Elvacite 2044 (duPont) (polymethylmethacrylate) | 90 |

The following mixes were then prepared:

| "A" Mix | |
|---|---|
| | Parts |
| resin solution | 100 |
| stabilizer | 1.0 |
| lactic acid | 0.7 |
| piperazine-aldehyde condensate | 4.0 |

| "B" Mix | |
|---|---|
| | Parts |
| resin solution | 142 |
| cyclic polyketone | 4 |

The coating composition obtained from 13 parts "B" and 10 parts "A" was coated onto 3 mil Mylar brand film with a No. 24 wire wound Meyer rod and dried to give a transparent film. The dried coated transparency was placed in contact with an infrared absorbing original and passed through a 3M Co. Thermofax Secretary brand thermal copier in the normal manner. Imaged transparencies suitable for overhead projection were obtained with images projected in a variety of colors. The following are examples of combinations used to prepare the transparencies.

TABLE II
TRANSPARENCY EXAMPLES

| | Condensate cyclic Diimino Compound | aldehyde | polyketo compound | image color |
|---|---|---|---|---|
| 1. | piperazine | benzaldehyde | ninhydrin | brown |
| 2. | " | salicylaldehyde | " | brown |
| 3. | " | 5-nitrosalicylaldehyde | " | brown |
| 4. | " | o-chlorobenzaldehyde | " | brown |
| 5. | " | p-chlorobenzaldehyde | " | brown |
| 6. | " | bromosalicylaldehyde | " | brown |
| 7. | " | 3,5-dibromosalicylaldehyde | " | brown |
| 8. | " | 2,4-dimethoxybenzaldehyde | " | brown |
| 9. | " | 2-hydroxy-3-methoxybenzaldehyde | " | brown |
| 10. | " | o-vanillin | " | brown-black |

TABLE II-continued
TRANSPARENCY EXAMPLES

| | Condensate cyclic Diimino Compound | aldehyde | polyketo compound | image color |
|---|---|---|---|---|
| 11. | " | 3,4,5-trimethoxy-benzaldehyde | " | brown-black |
| 12. | " | cinnamaldehyde | " | brown |
| 13. | " | α-methoxy cinnamaldehyde | " | brown |
| 14. | " | p-hydroxybenzaldehyde | " | brown-black |
| 15. | " | 5-hydroxy-2-nitro benzaldehyde | " | brown-black |
| 16. | " | m-nitrobenzaldehyde | " | brown-black |
| 17. | " | o-nitrobenzaldehyde | " | blue-black |
| 18. | " | 9-anthraldehyde | " | brown-black |
| 19. | " | 2-hydroxy-1-naphthaldehyde | " | brown |
| 20. | " | p-isopropyl-benzaldehyde | " | brown |
| 21. | " | p-cyanobenzaldehyde | " | brown |
| 22. | " | 1-naphthaldehyde | " | brown |
| 23. | " | o-methoxybenzaldehyde | " | brown |
| 24. | " | o-ethoxybenzaldehyde | " | brown-black |
| 25. | " | 6-nitroveratraldehyde | " | brown |
| 26. | piperazine | 3-ethoxy-4-hydroxy-benzaldehyde | ninhydrin | brown-black |
| 27. | " | 2,4-dinitrobenzaldehyde | " | brown-black |
| 28. | " | o-phthalic dicarboxaldehyde | " | dark blue |
| 29. | " | terphthal-dicarboxaldehyde | " | brown |
| 30. | " | p-N,N-dimethylamino cinnamaldehyde | " | brown-black |
| 31. | homopiperazine | p-chlorobenzaldehyde | " | dark brown |
| 32. | " | m-nitrobenzaldehyde | " | dark brown |
| 33. | " | cinnamaldehyde | " | brown |
| 34. | 2,5-dimethyl piperazine | 1-naphthaldehyde | " | brown |
| 35. | " | m-nitrobenzaldehyde | " | brown |
| 36. | " | o-phthalic dicarboxaldehyde | " | dark brown |
| 37. | 2-methyl-piperazine | 2-naphthaldehyde | " | dark brown |
| 38. | " | o-phthalic dicarboxaldehyde | " | dark brown |
| 39. | homopiperazine | p-chlorobenzaldehyde | Isatin | brown |
| 40. | " | " | 5-bromoisatin | brown |
| 41. | " | " | 5,7-dichloro-isatin | brown |
| 42. | " | " | 5-nitroisatin | brown |
| 43. | " | " | alloxan | red |
| 44. | " | " | alloxazine | red-brown |
| 45. | 2-methyl-piperazine | o-phthalic dicarboxaldehyde | 5-nitroisatin | " |
| 46. | 2-methyl-piperazine | " | alloxan | " |
| 47. | 2,5-dimethyl-piperazine | " | alloxan | " |

EXAMPLE B

Preparation of Coated Papers for Thermocopy, Thermal Printer, and Thermal Stylus Chart Recording Applications Separate grinds were made of the piperazine compounds, the cyclic polyketone derivatives, and any additives used as accelerators or stabilizers. The following examples list the combinations, ratios, coating weights and image colors obtained when imaged on a 3M Co. Thermofax Secretary brand thermal copier, a Texas Instrument Silent 700 brand matrix thermal printer and a Sanborn 500 Viso Cardiette thermal chart recorder. The mixes were prepared by ball-milling the components in a 5 percent aqueous polyvinyl alcohol solution at a 15 percent concentration of the dry components. The mixes were combined in the indicated ratios and coated with a No. 16 wire wound Meyer rod onto a 25 lb/3000 sq ft sulfite paper base stock.

TABLE III
COATED PAPER EXAMPLES

| | Condensate | additive | polyketone | ratio | weight sq ft | color |
|---|---|---|---|---|---|---|
| 1. | terephthaldehyde | — | hydrindantin | 1/2 | 1.5 | black |
| | " | — | " | 2/1 | 2.3 | black |
| 2. | " | — | Isatin | 1/2 | 2.7 | brown-black |
| 3. | " | — | alloxan | 1/2 | 3.9 | red-brown |
| 4. | " | — | hydrindantin | 1/4 | 3.8 | black |
| 5. | " | p-toluic acid | ninhydrin | 1/1/2 | 2.5 | brown-black |
| | " | " | " | 2/1/2 | 1.5 | dark-brown |
| | " | " | " | 4/1/2 | 1.4 | brown |
| | " | " | " | 8/1/2 | 1.9 | yellow-brown |

TABLE III-continued
COATED PAPER EXAMPLES

| | Condensate | additive | polyketone | ratio | weight sq ft | color |
|---|---|---|---|---|---|---|
| 6. | " | " | hydrindantin | 1/1/2 | 1.5 | dark brown |
| | " | " | " | 1/1/1 | 2.3 | brown-black |
| 7. | " | 2-mercapto-benzothiazole | " | 1/5/2 | 3.2 | dark brown |
| 8. | " | 2-mercapto-benzoxazole | " | 1/5/2 | 2.9 | dark brown |
| 9. | " | Thiofide | " | 1/5/2 | 3.3 | brown |
| 10. | " | 2-benzoxazolethiol | " | 1/5/2 | 3.5 | dark brown |
| 11. | " | 2-benzothiazolol | " | 1/5/2 | 2.8 | dark brown |
| 12. | " | 2-morpholino thiobenzothiazole | " | 1/5/2 | 4.0 | dark brown |
| 13. | terephthaldehyde | 2,4-dichloro-1-naphthol | hydrindantin | 1/1/2 | 3.5 | brown-black |
| 14. | " | 2-chloroacetamide | " | 1/2/2 | 4.4 | purple-black |
| 15. | o-phthalic dicarboxaidehyde | p-toluic acid | ninhydrin | 8/1/2 | 3.1 | brown |
| | " | " | " | 4/1/2 | 1.5 | brown |
| | " | " | " | 2/1/2 | 2.7 | brown |
| | " | " | " | 1/1/2 | 3.5 | brown |
| 16. | m-phthalic dicarboxaldehyde | o-toluic acid | hydrindantin | 2/1/1 | 3.2 | brown-black |
| 17. | 9-anthraldehyde | p-toluic acid | ninhydrin | 8/1/2 | 1.5 | brown |
| | " | " | " | 2/1/4 | 1.8 | brown-black |
| | " | " | " | 2/1/2 | 1.1 | brown-black |
| | " | " | " | 1/1/2 | 0.5 | dark brown |
| 18. | o-vanillin | p-toluic acid | " | 1/1/2 | 2.2 | brown-black |
| | " | " | " | 2/1/2 | 2.6 | dark-brown |
| | " | " | " | 4/1/2 | 2.5 | yellow-brown |
| | " | " | " | 8/1/2 | 2.5 | yellow-brown |
| 19. | m-nitrobenzaldehyde | m-toluic acid | ninhydrin | 1/1/2 | 2.5 | dark brown |
| | " | " | " | 2/1/2 | 2.6 | dark brown |
| | " | " | " | 4/1/2 | 2.3 | brown |
| | " | " | " | 8/1/2 | 1.6 | brown |
| 20. | 2-naphthaldehyde | p-toluic acid | " | 8/1/2 | 2.5 | yellow-brown |
| | " | " | " | 4/1/2 | 1.2 | dark brown |
| | " | " | " | 2/1/2 | 1.9 | brown-black |
| | " | " | " | 1/1/2 | 1.6 | brown-black |
| 21. | 1-naphthaldehyde | p-toluic acid | ninhydrin | 8/1/2 | 2.5 | dark brown |
| | " | " | " | 2/1/2 | 2.6 | brown-black |
| | " | " | " | 1/1/2 | 2.8 | black |
| 22. | o-nitrobenzaldehyde | p-toluic acid | " | 1/1/2 | 1.8 | black |
| | " | " | " | 2/1/2 | 2.2 | black |
| | " | " | " | 4/1/2 | 2.0 | black |
| | " | " | " | 8/1/2 | 2.1 | black |
| 23. | 1,3,5-trimethoxy-benzaldehyde | p-toluic acid | " | 1/1/2 | 2.0 | purple-black |
| | " | " | " | 2/1/2 | 1.8 | purple-black |
| 23. | 1,3,5-trimethoxy-benzaldehyde | p-toluic acid | ninhydrin | 1/1/2 | 2.0 | purple-black |
| | " | " | " | 2/1/2 | 1.8 | purple-black |
| | " | " | " | 4/1/2 | 1.8 | purple-black |
| | " | " | " | 8/1/2 | 1.6 | dark brown |
| 24. | 2,4-dinitro-benzaldehyde | p-toluic acid | ninhydrin | 1/1/2 | 1.8 | black |
| | " | " | " | 2/1/2 | 2.0 | black |
| | " | " | " | 4/1/2 | 1.9 | dark brown |
| | " | " | " | 8/1/2 | 1.7 | brown |
| 25. | p-puperazino-acetophenone | p-toluic acid | ninhydrin | 1/1/2 | 3.2 | black |
| 26. | p-piperazino-acetophenone | p-toluic acid | hydrindantin | 1/1/2 | 3.0 | brown-black |

What is claimed is:

1. A heat-sensitive, non-volatile, non-hygroscopic, and odor-free recording composition adapted to acquire a color contrasting visibly with a background color of the composition upon heating a selected region thereof to an elevated temperature, comprising an N-substituted condensation product of a heterocyclic diimino compound and an aromatic aldehyde, said heterocyclic diimino compound being selected from the group consisting of piperazine, homopiperazine, 2-methylpiperazine, and 2,5-dimethyl piperazine and a cyclic polyketo compound reactive with amines and amides at elevated temperatures to form a color, said cyclic polyketo compound being selected from the group consisting of ninhydrin, isatin, 5-bromoisatin, 5,7-dichloroisatin, 5-nitroisatin, alloxan, alloxazine, and hydrindantin.

2. The composition of claim 1, wherein said aromatic aldehyde is selected from the group consisting of aldehydes listed in Table II.

3. The composition of claim 1, and further comprising a stabilizer selected from the group consisting of substituted ureas and thioureas; gallic acid; o-toluic acid; m-toluic acid; p-toluic acid; 2-mercaptobenzothiazole; and 2,2'-dithiobis (benzothiazole).

4. The composition of claim 1, and further comprising an activator selected from Table I.

5. The composition of claim 1, and further comprising binder means adapted to bind said composition to a substrate.

* * * * *